US006322650B1

(12) United States Patent
Gilmore et al.

(10) Patent No.: US 6,322,650 B1
(45) Date of Patent: Nov. 27, 2001

(54) POLYSULFIDE-BASED POLYURETHANE SEALANT FOR INSULATING GLASS

(75) Inventors: John R. Gilmore, Crystal Lake; Steven J. Hobbs, Woodstock; Keith B. Potts, Elgin, all of IL (US)

(73) Assignee: Morton International Inc., Philadelphia, PA (US)

( * ) Notice: Subject to any disclaimer, the term of this patent is extended or adjusted under 35 U.S.C. 154(b) by 0 days.

(21) Appl. No.: 09/292,636

(22) Filed: Apr. 15, 1999

(51) Int. Cl.$^7$ ...................................................... B32B 17/00
(52) U.S. Cl. ........................ 156/107; 156/331.4; 428/419; 528/76; 528/85
(58) Field of Search ............................ 428/419; 156/107, 156/331.4; 528/85, 76

(56) References Cited

U.S. PATENT DOCUMENTS

| | | | |
|---|---|---|---|
| 2,466,963 | | 4/1949 | Patrick et al. . |
| 3,386,963 | * | 6/1968 | Santaniello ............................ 528/76 |
| 3,446,780 | * | 5/1969 | Bertozzi ............................... 528/85 |
| 3,852,149 | * | 12/1974 | Sitter et al. ........................... 156/107 |
| 4,059,570 | | 11/1977 | Oswald . |
| 4,425,389 | * | 1/1984 | Schöllhorn et al. ................. 156/107 |

* cited by examiner

*Primary Examiner*—John J. Gallagher
(74) *Attorney, Agent, or Firm*—Stephen T. Falk

(57) ABSTRACT

An insulated glass sealant having the best characteristics of polysulfides and polyurethanes rather than the worst is made from a polysulfide-based polyurethane which, in turn, is derived from a mixture of hydroxyl terminated polysulfides having a structure represented by the following formula:

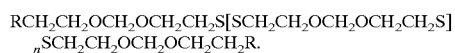

wherein R=HO(CH$_2$)$_y$SS, y is from 2 to 6, and n is such that the molecular weight is from about 2500 to about 4000. The improved sealant of this invention is prepared by a one-step procedure wherein the hydroxyl terminated polysulfide of said formula is reacted with a polyisocyanate at a ratio between about 1:1 and about 1:1.2 on an equivalents basis. The hydroxyl-terminated polysulfide is made by splitting a polysulfide having a molecular weight about 30 times greater in an aqueous latex dispersion with a dithiodialkylene glycol and sodium sulfite.

10 Claims, No Drawings

POLYSULFIDE-BASED POLYURETHANE SEALANT FOR INSULATING GLASS

FIELD OF THE INVENTION

This invention relates to an improved sealant for insulating glass windows which has a combination of the best properties of a polyurethane and a polysulfide. It further relates to a hydroxyl terminated polysulfide from which said polyurethane is made.

The term "insulating glass window" refers to a structure comprising panes of glass, the faces of which are in spaced relationship, thereby providing a space between the panes which imparts insulating properties to the structure. In its most widely used form, 2 parallel panes are positioned in spaced relationship by metallic or organic resin spacers placed inboard around the perimeter of the panes, thereby forming a U-shaped channel in which the interior faces of the pane are the legs and a side of the spacer is the base of the channel. Typically, the spacer is a hollow form filled with a water-absorbent material, such as a molecular sieve, to keep the enclosed air space dry. The U-shaped channel around the perimeter of the window is filled with a sealant which must have a combination of properties for satisfactory use. Some of those properties are as follows.

The sealant must have very low moisture vapor transmission (MVT) rate so that moisture is prevented from entering the dry space between the panes of glass. Moisture in such space tends to reduce its insulating value and it can also condense on the interior faces of the panes, creating visibility and aesthetic problems. If the sealant does not have a satisfactory MVT rate, the longevity of the insulated unit will be severely reduced.

The sealant should have good elongation and flexibility so that it "gives" during contraction and expansion of the insulated glass structure caused by temperature changes, thus relieving glass stress.

The sealant should also form an excellent bond with glass which is not degraded over long periods of use when exposed to sunlight, moisture, and large temperature changes. Lap shear strength and tensile adhesion strength are important factors of the bond strength.

In U.S. Pat. No. 3,386,963, Santaniello discloses certain isocyanate terminated polysulfide pre-polymers that are curable with polyols to form sealants and adhesives. The pre-polymers are made from hydroxyl terminated polysulfides having the formula:

HO—R'SS(R"SS)$_n$R'—OH wherein R' and R" are the same bivalent alipatic radical wherein the carbon chain may be interrupted by oxygen atoms and the molecular weight is from 500 to 9000. There is no teaching, however, about the properties of polyurethanes having a polysulfide backbone when R' is polymethylene.

SUMMARY OF THE INVENTION

It is unexpected that such polyurethanes exhibit some of the best characteristics of both polymers rather than the worst of each.

It is an object of this invention, therefore, to provide a method for sealing insulating glass windows with rugged sealants that combine the excellent liquid polysulfide attributes of low argon migration, good resistance to free radical oxidation, and good workability with the polyurethane characteristics of low MVT, low water swell, good electrical resistance, good resistance to solvents and wood preservatives, and good adhesion to organic components of insulated glass windows.

It is another object of this invention to provide a sealant whose hardness is greater than that of a polysulfide-based polyurethane sealant of the prior art having the same molecular weight and cross-link density.

It is a related object of this invention to provide an isocyanate-terminated polysulfide which may be used as an intermediate or precursor in the formation of the insulated glss sealant.

These and other objects which will become apparent from the following description of the invention are achieved by splitting the polysulfide having the general structure of Formula I, as follows:

HSCH$_2$CH$_2$OCH$_2$OCH$_2$CH$_2$S[S$_x$CH$_2$CH$_2$OCH$_2$OCH$_2$CH$_2$S]$_m$S$_x$CH$_2$CH$_2$OCH$_2$OCH$_2$CH$_2$SH wherein x averages 1.25, at the S—S$_x$ bond by reacting it as a latex dispersion in water with a dithiodialkyleneglycol and aqueous sodium sulfite at the reflux temperature, and adding hydrogen peroxide for oxidative coupling of chains having residual sulfhydryl groups. This yields a mixture of hydroxyl terminated polysulfides having an average molecular weight about 3% of the initial value and having the general structure represented by Formula II:

RCH$_2$CH$_2$OCH$_2$OCH$_2$CH$_2$ S[SCH$_2$CH$_2$OCH$_2$OCH$_2$CH$_2$S]$_n$SCH$_2$CH$_2$OCH$_2$OCH$_2$CH$_2$R wherein R=HO(CH$_2$)$_y$SS, y is from 2 to 6, and (n <<<m) of Formula I and is such that the molecular weight is from about 2500 to about 4000.

The general structures represented by Formula I and Formula II may be modified by a limited degree of crosslinking introduced into the product of the first step in the preparation of the well known liquid polysulfides known by the trademark LP. Up to about 2% by weight of a crosslinking agent such as 1,2,3-trichloro-propane may be used. The two step preparation of the liquid polysulfides is described in U.S. Pat. No. 2,789,958, which is incorporated herein by reference.

The improved sealant of this invention may then be prepared by a one-step procedure wherein the hydroxyl terminated polysulfide of Formula II is reacted with a polyisocyanate at a ratio between about 1:1 and about 1:1.2, preferably about 1:1.15 (e.g., about 1:1.08), on an equivalents basis. The final stages of the reaction may take place after the partially cured sealant is in place in the window. Alternatively, the formation of the sealant may be undertaken in a two-step procedure wherein an isocyanate-terminated polysulfide is formed first and then the stoichiometric requirement of additional hydroxy-terminated polysulfide is mixed with the precursor.

DETAILED DESCRIPTION OF THE INVENTION

The dithiodialkylene glycols, wherein the alkylene group contains from 2 to 6 carbon atoms, are prepared by the method taught in U.S. Pat. No. 2,527,378, which also is incorporated herein by reference. The simplest dithiodialkylene glycol, often simply called dithiodiglycol, is the preferred one but other examples include dithiodipropylene glycol, dithiodibutylene glycol, and dithiodihexylene glycol.

In Formula II, n=11–23 or such that the molecular weight of the hydroxyl terminated polysulfide is from about 2000 to about 4000, preferably from about 2500–3500.

A wide variety of polyisocyanates can be reacted suitably with the above-described hydroxyl terminated polysulfides to prepare the polysulfide-based polyurethanes that have found in this invention to be superior insulated glass sealants. Generally, any of the organic polyisocyanates that have been proposed previously for the preparation of polyurethane resins may be employed here. Suitable polyisocyanates are, for example, isophorone diisocyanate (abbreviated as IPDI); arylene polyisocyanates such as tolylene-, metaphenylene-, methylene-bis-(phenylene-4-) (abbreviated as MDI and sold under the trademark RUBINATE 9310), biphenylene-4,4'-; 3,3'-dimethoxybiphenylene-4,4'-; 3,3'-biphenylene-4,4'-; and methylene-(tetramethylxylene-) (abbreviated as MTMXDI); alkylene polyisocyanates such as ethylene-, ethylidene-, propylene-1,2-, butylene-1,4-; butylene-1,3-; cyclohexylene-1,4-,; methylene-bis (cyclohexyl-4,4')-; and hexamethylene-1,6-diisocyanate (abbreviated as HDI. Commercially available isocyanate-terminated prepolymers such as the MDI prepolymer sold under the trademark RUBINATE 1790 are also suitable as curing agents in this invention.

A suitable procedure for making the insulated glass sealants of this invention comprises making a sealant base first by mixing the hydroxyl terminated polysulfide, a curing catalyst, a chain stopper, a plasticizer, fillers, dehydrating agents, and thixotropic agents. The sealant base (Part A)is sold along with the curing agent (Part B)as a two part package to be combined shortly before placement around the perimeter of the U-shaped channel of a twin-paned window. The general procedure for making the sealant base comprises blending the polysulfide, chain stopper and plasticizer in a vessel such as a ROSS, HOCKMEYER, or SHAR mixer using a sweep blade. The thixotropic agents, fillers, and dehydrating agents are then dispersed in the blend and ground at high speed under full vacuum until a Hegman grind of less than 2 mils is achieved. Moisture is reduced to less than 400 ppm by azeotropic distillation with toluene. An adhesion promoter, catalyst, and, if needed, additional thixotropic agents are then blended in to finish off the sealant base. To make Part B, one or more of the polyisocyanate curing agents is mixed under a nitrogen atmosphere with or without a pigment.

The hydroxyl-terminated polysulfides of this invention may be converted into readily curable isocyanate-terminated polysulfides for use as prepolymers in this invention by the reaction of a polyisocyanate with said polysulfide using NCO:OH ratios above 1.2:1, preferably about 2:1 or higher. Said prepolymers have the formula:

OCN—[R$^1$NH—C (O)—R$^2$—CH$_2$CH$_2$OCH$_2$OCH$_2$CH$_2$S—
[SCH$_2$CH$_2$OCH$_2$OCH$_2$CH$_2$S]
$_n$SCH$_2$CH$_2$OCH$_2$OCH$_2$CH$_2$R$^3$(O)CNH]$_z$R$^4$NCO wherein R$^1$ and R$^4$ is an alkylene, aralkylene, or alkarylene radical; R$^2$ and R$^3$ are —(OCH$_2$)$_x$SS—; x is from 2 to 6; z is from 1 to about 15; and n is from 11 to 23.

They may be stored and shipped to desired locations safely. A fully cured sealant may be achieved by mixing the prepolymer with the stoichiometrically necessary amount of any polyol that is conventional in the polyurethane art and placing the mixture around the perimeter of the U-shaped channel between two glass panes. It is preferred, however, to use the hydroxyl terminated polysulfide of Formula II as the polyol in the curing reaction.

The sealants of this invention contain from about 20% to about 30%, preferably from about 24 to about 28%, by weight of the polysulfide-based polyurethane described herein.

A variety of catalysts, including tertiary amines, may be used to promote the cure of the polysulfide-based prepolymers to the corresponding polyurethanes but the preferred catalysts include the diorganotin carboxylates having from about 1 to 4 carbon atoms in the organotin moiety and from about 8 to about 12 carbon atoms in the carboxylate moiety, as exemplified by dibutyltin dilaurate. The catalysts may be used alone or in combination in amounts from about 0.0001% to about 0.1% by weight of the formulated reaction mixture. The rate of reaction may be slowed down, when desired, by the addition of from about 0.005 to about 0.1% by weight of a regulator such as oleic acid or the like. The molecular weight of the polysulfide-based polyurethane may be regulated by the addition of a chain stopper such as n-decyl mercaptan to Part A of the sealant package.

The curing time of the sealants made according to this invention varies from 20 to 90 minutes, depending largely upon the molecular weight of the hydroxyl terminated polysulfide, the temperature, and the type of catalyst or regulator, if any, used.

The sealants of this invention also contain from about 50 to about 60% by weight of fillers such as calcium carbonate, talc, mica, and platey clays. Said sealants may optionally also contain from about 0.4 to about 1% by weight of a glass adhesion promoter such as a silane exemplified by aminopropyl-trimethoxysilane. From about 15 to about 25% of a plasticizer may also be present in the sealants of this invention. Examples of a plasticizer include the alkylbenzyl phthalates (e.g., alkyl is octyl) and chlorinated paraffins. Included among other optional components of the sealants of this invention are colorants, ultra-violet light stabilizers, and other rheology control agents.

The sealants of this invention have an MVT rate not greater than 20, preferably not greater than 10–14, grams/m$^2$/day as determined by ASTM F-1249.

The sealants of this invention form an excellent bond with glass, aluminum, and MYLAR films. A lap shear strength, as determined by ASTM C-961, of from about 100 to about 150 pounds per square inch is preferred. Their tensile adhesion strength is at least about 80, preferably at least about 110 pounds per square inch. as determined by ASTM C-1135.

The sealants of this invention have an elongation of at least about 100%, preferably 200%, as determined by ASTM-D412.

The following examples illustrate the preparation of the hydroxy-terminated polysufide and the insulated glass sealant of this invention.

Preparation of 0.2% Crosslinked Polysulfide

A 12-liter, three-necked flask equipped with a reflux condenser, stirrer and a thermocouple was charged with 7520 ml of an aqueous sodium polysulfide solution of molarity 2.03 and rank 2.26. This was followed by 70 g of a 5% by weight aqueous solution of AEROSOL OS surfactant(5 g solution per mole of monomers). The 256.6 g of 20.8% aqueous solution of magnesium chloride (0.56 mole) (4 mole % relative to monomers) was added to the mixture and a colloidal suspension formed immediately. With good stirring, the suspension was warmed to 82° C. and a solution 0.2 mole% of 1,2,3-trichloropropane (4.1289 g,0.28 mole) in 2417.7 g (13.972 moles) of bis-2-chloroethyl formal was added in one hour. An exothermic reaction raised the temperature to the reflux point during the first 0.5 hour of addition. A milky orange suspension of polymer begins to form and the reaction was completed at the reflux temperature (about 104° C.) for another 7 hours.

After cooling, the resultant latex was washed nine times with 6 liter portions of tap water, allowing the latex to settle out between washes and removing the supernatant by suction. The yield of latex solids, determined by measuring the weight % solids in the salt-free suspension, was 2304.1 g (13.22 moles) or 94.4% based on the weight of the formal and trichloropropane.

Preparation of Hydroxy-terminated Polysulfide

The washed latex, comprising 2272.6 g (13.04 moles) of solids, was charged into a 12-liter, four-necked flask equipped with a stirrer, reflux condenser, and a thermocouple and was heated to 85° C. Sodium sulfite (616.4 g, 4.89 moles) and dithiodiglycol (223.g, 1.45 moles) were then added in rapid succession and the suspension was heated at 100° C. for about 3 hours. The suspension of split polymer was washed eight times with 6 liter portions of water to remove residual sulfite. The suspension of the split polymer was stirred while 44 ml of aqueous ammonia (0.6512 mole) was added, followed by 190.2g of a 35% hydrogen peroxide solution (1.956 moles) at 21° C. The hydrogen peroxide removes traces of residual mercaptan end groups by oxidizing them to disulfides, leaving only hydroxyl terminals on the polymer.

The suspension was held at room temperature for 22 hours before 190.1 g(1.825 moles) of sodium bisulfite was added to isolate the polymer. The suspension was washed 6 times with 6 liter portions of water and then stripped of water to provide 2184.5 g of hydroxy-terminated oligomeric polysulfide, a 91% yield based on the combined moles of latex and dithiodiglycol. The product had a hydroxyl number of 37 (corresponding to a molecular weight of 3030) and a SH content of 0.09% by weight.

EXAMPLE 1

Part A of the sealant package was prepared by charging 23,115 g (24.3 equivalents) of a hydroxy-terminated oligomeric polysulfide made according to the procedure described above into a HOCKMEYER mixer followed by, in order, 9725 g of a plasticizer (SANTICIZER 261), 56.7 g (0.8 eq.)of n-decyl mercaptan as a chain stopper, 354.6 g of a phenolic adhesion promoter (METHYLON 75–108), 10931.6 g of a precipitated calcium carbonate as a thixotropic agent (HAKUENKA CC),7.04 g of a tin carboxylate (T-12) as a catalyst for subsequent curing, 23414.4 g of a ground calcium carbonate as a filler (GAMMASPERSE 255), and 1061.4 g of a molecular sieve powder (particle size 3Å)as a dehydrating agent. The mixture was ground at high speed under a vacuum for about one hour. Toluene was added after breaking the vacuum and azeotropic distillation with continued grinding was carried out for about two hours to a pot temperature of 179° F. to remove water. To the hot residue there was added 709.4 g of Silane A-1100 adhesion promoter and the mixture was stirred for about 20 minutes under a partial vacuum. The resulting material was mixed with 226.8 g of a colloidal silica (CAB-O-SIL TS-720) under vacuum at room temperature for about 0.5 hour to obtain a Part A material having a satsfactorily low slump.

An amount of a curing agent sufficient to cure 47972 g (20.42 eq.) of Part A at an NCO/OH ratio of 1.15:1 (the Index) was prepared by blending 1000 g of an MDI prepolymer (RUBINATE 1790), 3000 g of MDI (RUBINATE 9310)in a closed vessel under a nitrogen blanket until a uniform mix was obtained. The equivalent weight was 170.8.

EXAMPLE 2

The moisture vapor transmission rateof an insulated glass sealant made according the general procedure of Example 1 except for the substitution of a chlorinated plasticizer (OXY 54–120) in place of the SANTICIZER-261 was measured along with its permeance and permeability by the ASTM F-1249-90 method. The results are given in the following table:

| Sample | MVT g/m²/ day | Thickness Avg of 5 | Permeance | Permeability | Average Permeance | Average Permeability |
|---|---|---|---|---|---|---|
| 1 | 15.2 | 0.07752 | 0.030984 | 0.06101 | 0.32309 | 0.06477 |
| 2 | 16.5 | 0.08022 | 0.33624 | — | — | |

What is claimed is:

1. A method for sealing an insulated glass window which comprises filling a U-shaped channel around the perimeter of the window and between two panes of glass with a mixture of a hydroxyl terminated polysulfide having the formula:

$$RCH_2CH_2OCH_2OCH_2CH_2S[SCH_2CH_2OCH_2OCH_2CH_2S]_nSCH_2CH_2OCH_2OCH_2CH_2R$$

wherein R=HO(CH$_2$)$_y$SS—, y is from 2 to 6, and n is such that the molecular weight is from about 2500 to about 4000, a catalyst, and a polyisocyanate at an NCO/OH ratio of between about 1:1 and about 1.2:1 and curing said mixture to form a polysulfide-based polyurethane sealant.

2. The method of claim 1 wherein the polyisocyanate is a diisocyanate.

3. The method of claim 1 wherein the molecular weight is from about 2500 to about 3500.

4. The method of claim 1 wherein the NCO/OH ratio is from about 1:1 to about 1.15:1.

5. An insulated glass sealant comprising a polysulfide-based polyurethane prepared by reacting a hydroxyl terminated polysulfide having the formula:

$$RCH_2CH_2OCH_2OCH_2CH_2S[SCH_2CH_2OCH_2OCH_2CH_2S]_nSCH_2CH_2OCH_2OCH_2CH_2R$$

wherein R=HO(CH$_2$)$_x$SS—, x is from 2 to 6, and n=11–23, with a polyisocyanate at an NCO/OH ratio of between about 1:1 and about 1.2:1.

6. The sealant of claim 5 wherein the polyisocyanate is a diisocyanate.

7. The sealant of claim 5 wherein n=14–20.

8. The sealant of claim 5 wherein the NCO/OH ratio is from about 1:1 to about 1.15:1.

9. The sealant of claim 5 characterized further by the presence of a plasticizer and a glass adhesion promoting silane.

10. An isocyanate-terminated polysulfide having the formula:

$$OCN—[R^1NH—C(O)—R^2—CH_2CH_2OCH_2OCH_2CH_2S—[SCH_2CH_2OCH_2OCH_2CH_2S]_nSCH_2CH_2OCH_2OCH_2CH_2R^3(O)CNH]_zR^4NCO$$

wherein R$^1$ and R$^4$ are alkylene, aralkylene, or alkarylene radicals; R$^2$ and R$^3$ are —(OCH$_2$)$_x$SS—; x is from 2 to 6; z is from 1 to about 15; and n is from 11 to 23.

* * * * *